(12) United States Patent
Heiskanen et al.

(10) Patent No.: US 12,258,710 B2
(45) Date of Patent: Mar. 25, 2025

(54) MULTILAYER FILM COMPRISING HIGHLY REFINED CELLULOSE FIBERS

(71) Applicant: Stora Enso OYJ, Helsinki (FI)

(72) Inventors: Isto Heiskanen, Imatra (FI); Kaj Backfolk, Lappeenranta (FI); Katja Lyytikäinen, Imatra (FI); Jukka Kankkunen, Imatra (FI)

(73) Assignee: Stora Enso OYJ, Helsinki (FI)

( * ) Notice: Subject to any disclaimer, the term of this patent is extended or adjusted under 35 U.S.C. 154(b) by 227 days.

(21) Appl. No.: 17/995,446

(22) PCT Filed: Apr. 14, 2021

(86) PCT No.: PCT/IB2021/053070
§ 371 (c)(1),
(2) Date: Oct. 4, 2022

(87) PCT Pub. No.: WO2021/209916
PCT Pub. Date: Oct. 21, 2021

(65) Prior Publication Data
US 2023/0151545 A1    May 18, 2023

(30) Foreign Application Priority Data
Apr. 15, 2020 (SE) .................................. 2050423-9

(51) Int. Cl.
| | |
|---|---|
| *D21F 11/04* | (2006.01) |
| *B32B 3/26* | (2006.01) |
| *B32B 5/02* | (2006.01) |
| *B32B 5/26* | (2006.01) |
| *B32B 7/12* | (2006.01) |
| *B32B 37/12* | (2006.01) |
| *D21H 11/18* | (2006.01) |
| *D21H 19/34* | (2006.01) |

(Continued)

(52) U.S. Cl.
CPC .............. *D21F 11/04* (2013.01); *B32B 3/266* (2013.01); *B32B 5/02* (2013.01); *B32B 5/26* (2013.01); *B32B 7/12* (2013.01); *B32B 37/1284* (2013.01); *D21H 11/18* (2013.01); *D21H 19/34* (2013.01); *D21H 23/24* (2013.01); *D21H 23/48* (2013.01); *D21H 23/50* (2013.01); *D21H 27/36* (2013.01); *B32B 2250/20* (2013.01); *B32B 2250/40* (2013.01); *B32B 2255/02* (2013.01); *B32B 2255/26* (2013.01); *B32B 2262/062* (2013.01); *B32B 2307/412* (2013.01); *B32B 2307/414* (2013.01); *B32B 2307/718* (2013.01); *B32B 2307/724* (2013.01)

(58) Field of Classification Search
CPC .......... D21F 11/04; D21F 1/00; D21H 11/18; D21H 19/34; D21H 23/24; D21H 23/48; D21H 23/50; D21H 27/36; D21H 27/32; D21H 27/30; B32B 3/266; B32B 5/02; B32B 5/26; B32B 7/12; B32B 37/1284; B32B 2250/20; B32B 2250/40; B32B 2255/02; B32B 2255/26; B32B 2262/062; B32B 2307/412; B32B 2307/414; B32B 2307/718; B32B 2307/724; B32B 27/32; B32B 2262/02; B32B 2262/04; B32B 27/10; B32B 27/36; B32B 2307/72; B32B 2307/7244; B32B 2307/7246; B32B 2439/40; B32B 2439/70; B32B 29/005; B32B 29/02; B32B 2250/02; B32B 2307/7242; C08L 1/02; C09J 101/02; C09J 197/005; C09J 197/00; B82Y 30/00; C08J 5/18

See application file for complete search history.

(56) References Cited

U.S. PATENT DOCUMENTS 3,475,198 A * 10/1969 Drum .................. D01D 5/0069
264/441
10,138,599 B2 * 11/2018 Aulin .................... D21H 23/50
(Continued)

FOREIGN PATENT DOCUMENTS

| CN | 104005267 A | 8/2017 |
|---|---|---|
| CN | 110506143 A | 11/2019 |

(Continued)

OTHER PUBLICATIONS

International Search Report from corresponding PCT application No. PCT/IB2021/053070, mailed on Jun. 9, 2021.
(Continued)

*Primary Examiner* — Jose A Fortuna
(74) *Attorney, Agent, or Firm* — Greer, Burns & Crain, Ltd.

(57) ABSTRACT

The present invention relates to a method for manufacturing a multilayer film comprising highly refined cellulose fibers, the method comprising the steps of: a) forming a first wet web by applying a first pulp suspension comprising highly refined cellulose fibers on a first wire; b) partially dewatering the first wet web to obtain a first partially dewatered web; c) forming a second wet web by applying a second pulp suspension comprising highly refined cellulose fibers on a second wire; d) partially dewatering the second wet web to obtain a second partially dewatered web; e) applying a binder between the first and second partially dewatered web and joining the first and second partially dewatered web to obtain a multilayer web; and f) further dewatering, and optionally drying, the multilayer web to obtain a multilayer film comprising highly refined cellulose fibers.

21 Claims, No Drawings

(51) Int. Cl.
*D21H 23/24* (2006.01)
*D21H 23/48* (2006.01)
*D21H 23/50* (2006.01)
*D21H 27/36* (2006.01)

(56) References Cited

U.S. PATENT DOCUMENTS

| | | | |
|---|---|---|---|
| 10,576,721 B2 * | 3/2020 | Neagu | B32B 29/02 |
| 2005/0098291 A1 | 5/2005 | Kangas et al. | |
| 2012/0298319 A1 | 11/2012 | Fujiwara et al. | |
| 2013/0209772 A1 * | 8/2013 | Sandstrom | B32B 27/306 428/220 |
| 2016/0016717 A1 | 1/2016 | Toubeau | |
| 2017/0342661 A1 * | 11/2017 | Aulin | D21H 23/50 |
| 2020/0086604 A1 | 3/2020 | Land Hensdal et al. | |
| 2022/0298264 A1 * | 9/2022 | Heiskanen | B31F 1/0077 |
| 2023/0151553 A1 * | 5/2023 | Heiskanen | B32B 27/36 162/127 |
| 2024/0229358 A9 * | 7/2024 | Heiskanen | D21H 23/48 |

FOREIGN PATENT DOCUMENTS

| | | | |
|---|---|---|---|
| CN | 116096791 A * | 5/2023 | C08J 3/03 |
| EP | 0955408 A3 * | 5/2000 | D21H 23/50 |
| EP | 2771390 A2 | 9/2014 | |
| EP | 2772584 A1 | 9/2014 | |
| JP | 2012197544 A | 10/2012 | |
| WO | 2013060934 A2 | 5/2013 | |
| WO | 2019123405 A1 | 6/2019 | |

OTHER PUBLICATIONS

D. Fengel, Ultrastructural behaviour of cell wall polysaccharides, TAPPI, 1970, vol. 53, No. 3, pp. 497-503 (abstract only), 2018.
Gary Chinga-Carrasco, Celllulose fibres, nanofibrils and microfibrils: The morphological sequence of MFC components from a plant physiology and fibre technology point of view, Chinga-Carrasco Nanoscale Research Letters, 2011, 6:417, http://www.nanoscalereslett.com/content/6/1/417.

* cited by examiner

MULTILAYER FILM COMPRISING HIGHLY REFINED CELLULOSE FIBERS

This application is a U.S. National Phase under 35 U.S.C. § 371 of International Application No. PCT/IB2021/053070, filed Apr. 14, 2021, which claims priority under 35 U.S.C. §§ 119 and 365 to Swedish Application No. 2050423-9 filed Apr. 15, 2020.

TECHNICAL FIELD

The present disclosure relates to gas barrier films, e.g. useful in paper and paperboard based packaging materials. More specifically, the present disclosure relates to methods for manufacturing films comprising highly refined cellulose fibers, particularly films comprising microfibrillated cellulose (MFC).

BACKGROUND

Effective gas, aroma, and/or moisture barriers are required in packaging industry for shielding sensitive products. Particularly, oxygen-sensitive products require an oxygen barrier to extend their shelf-life. Oxygen-sensitive products include many food products, but also pharmaceutical products and electronic industry products. Known packaging materials with oxygen barrier properties may be comprised of one or several polymer films or of a fibrous paper or board coated with one or several layers of an oxygen barrier polymer, usually as part of a multilayer coating structure. Another important property for packaging for food products is resistance to grease and oil.

More recently, microfibrillated cellulose (MFC) films have been developed, in which defibrillated cellulosic fibrils have been suspended e.g. in water, re-organized and rebonded together to form a continuous film. MFC films have been found to provide good gas barrier properties as well as good resistance to grease and oil.

MFC films may be made by use of casting technologies, including applying an MFC dispersion onto a non-porous cast substrate, such as a polymeric or metal substrate, and drying said film by evaporation. The advantages of this technology include uniform thickness distribution and a smooth surface of the film. The publication EP2771390 A4 describes preparation of MFC films, in which an aqueous cellulose nanofiber dispersion is coated on a paper or polymeric substrate, dried and finally peeled off as a nanofiber film sheet.

A problem connected with the casting process is that when the film is forming in the drying step, the slow diffusion of water restricts the drying rate. The diffusion of water vapor through the film is a slow process which has a negative impact on the process efficiency. If the drying speed is increased, pinholes may be formed in the film, deteriorating its barrier properties. A further problem with the cast process is the formation of shrink tensions in the formed film which may have a negative impact on its strength properties, such as strain at break or tensile strength.

Alternatively, the film can be made by applying an MFC suspension on a porous substrate forming a web followed by dewatering of the web by draining water through the substrate for forming the film. The porous substrate may for example be a membrane or wire fabric or it can be a paper or paperboard substrate. Formation of the web can be accomplished e.g. by use of a paper- or paperboard machine type of process. US patent application US20120298319 A1 teaches a method of manufacturing of an MFC film by applying a furnish comprising MFC directly on porous substrate thus allowing the MFC to be dewatered and filtered.

Manufacturing of films and barrier substrates from highly refined cellulose or suspension with very slow drainage is difficult on a paper machine since it is difficult to create good barriers due to occurrence of pinholes. Pinholes are microscopic holes that can appear in the web during the forming process. Examples of reasons for the appearance of pinholes include irregularities in the pulp suspension, e.g. formed by flocculation or re-flocculation of fibrils, rough dewatering fabric, uneven pulp distribution on the wire, or too low a web grammage. Pinhole formation typically increases with increased dewatering speed. However, in pinhole free areas, the Oxygen Transmission Rate value is good when grammage is above 20-40 g/m$^2$.

One approach to improve barrier properties has been to make a thin base substrate, which comprises some pinholes, and then to coat the substrate with a polymeric coating composition. This approach, however, requires a coating concept and a coating formulation that is optimized in terms of surface filling and simultaneously providing barrier. Coating of a thin web is also challenging since the coating may cause web breaks. The number of times a substrate is rewetted and dried, should also be kept to a minimum since each additional step adds costs. Polymeric coatings may also reduce the repulpability of the film and thereby the recyclability of products comprising the film.

Another possibility discussed in the prior art would be to have extremely slow dewatering time, however this is not feasible for high speed and intensive drainage concepts.

Another solution would be to increase the grammage or coarseness of the film, but that will significantly increase dewatering time and increase risk for pinholes, respectively.

From a technical and economical point of view, it would be preferable to find a solution that enables fast dewatering, and at the same time improves either the film mechanical properties or barrier properties, or both.

DESCRIPTION OF THE INVENTION

It is an object of the present disclosure to provide a method for manufacturing a film comprising highly refined cellulose fibers, such as microfibrillated cellulose (MFC), which alleviates at least some of the above mentioned problems associated with prior art methods.

It is a further object of the present disclosure to provide a method for manufacturing a film comprising highly refined cellulose fibers with reduced pinhole formation.

It is a further object of the present disclosure to provide an improved method for manufacturing a film comprising highly refined cellulose fibers in a paper or paperboard machine type of process.

It is a further object of the present disclosure to provide a film useful as gas barrier in a paper or paperboard based packaging material which is based on renewable raw materials.

It is a further object of the present disclosure to provide a film useful as gas barrier in a paper or paperboard based packaging material with high repulpability, providing for high recyclability of packaging products comprising the film.

The above-mentioned objects, as well as other objects as will be realized by the skilled person in the light of the present disclosure, are achieved by the various aspects of the present disclosure.

According to a first aspect illustrated herein, there is provided a method for manufacturing a multilayer film comprising highly refined cellulose fibers, the method comprising the steps of:
- a) forming a first wet web by applying a first pulp suspension comprising highly refined cellulose fibers on a first wire;
- b) partially dewatering the first wet web to obtain a first partially dewatered web;
- c) forming a second wet web by applying a second pulp suspension comprising highly refined cellulose fibers on a second wire;
- d) partially dewatering the second wet web to obtain a second partially dewatered web;
- e) applying a binder between the first and second partially dewatered web and joining the first and second partially dewatered web to obtain a multilayer web; and
- f) further dewatering, and optionally drying, the multilayer web to obtain a multilayer film comprising highly refined cellulose fibers.

The term film as used herein refers generally to a thin continuous sheet formed material. Depending on the composition of the pulp suspension, the film can also be considered as a thin paper or even as a membrane. The film preferably has a grammage below 100 g/m$^2$, preferably in the range of 20-100 g/m$^2$. The multilayer film is typically relatively dense. In some embodiments, the multilayer film has a density above 600 kg/m$^3$, preferably above 900 kg/m$^3$.

The inventive method allows for manufacturing a film comprising highly refined cellulose fibers in a paper machine type of process. More importantly, the method allows for the manufacture of films having a relatively high grammage in the range of 20-100 g/m$^2$ which films have a very low occurrence of pinholes or are substantially pinhole free. Because of the content of highly refined cellulose fibers, the resulting multilayer film will typically have a density above 600 kg/m$^3$, preferably above 900 kg/m$^3$. Such films have been found to be very useful as gas barrier films, e.g. in packaging applications. The films can be used to replace conventional barrier films, such as synthetic polymer films which reduce the recyclability of paper or paperboard packaging products. The inventive films have high repulpability, providing for high recyclability of the films and paper or paperboard packaging products comprising the films.

The manufacturing method involves the separate preparation and partial dewatering of two lower grammage webs. The partially dewatered but still wet webs are joined to form a higher grammage multilayer web, which is subsequently further dewatered and optionally dried to obtain a multilayer film comprising the highly refined cellulose fibers. Joining the webs while they are still wet will typically ensure good adhesion between the layers. In fact, if the composition of the two layers is identical, the resulting multilayer film may even be difficult to distinguish from a single layer film of corresponding thickness.

The partial dewatering and lamination of the webs in the partially dewatered state has been found to substantially eliminate occurrence of pinholes in the finished multilayer film, while still allowing a high production speed. In the prior art, increased dewatering speed has sometimes been achieved by using large amounts of retention and drainage chemicals at the wet end of the process, causing increased flocculation. However, retention and drainage chemicals may also cause a more porous web structure, and thus there is a need to minimize the use of such chemicals. The inventive method provides an alternative way of increasing dewatering speed, which is less dependent on the addition of retention and drainage chemicals.

The present inventors have also found that various functional additives can advantageously be added between the partially dewatered webs prior to joining them. Additives can be added to one or both of the web surfaces to be joined. Sandwiching additives between the partially dewatered webs in this manner has several advantages as compared to adding them directly in the pulp suspension prior to forming, including less interference with the forming process, and better retention of the additives in the web.

As mentioned, joining the webs while they are still wet will typically ensure good adhesion between the layers. However, in some cases it may be desirable to even further improve contact and adhesion between the layers. The present inventors have found that applying a binder, or adhesive, between the first and second partially dewatered web before joining the webs to obtain a multilayer web results in better and more uniform adhesion. The binder may also further improve the barrier properties of the finished multilayer film. The binder may be applied to the wet or partially dewatered web in liquid or solid form and is applied by spray coating, curtain coating or foam coating.

Examples of possible binders include fine nanocellulose and nonionic or anionic or weakly amphoteric water soluble polymers. A problem when such materials are added directly in the pulp suspension in the head box is that they affect drainage but their retention in the formed web is insufficient.

Although different arrangements for performing the steps of the inventive method could be contemplated by the skilled person, the inventive method may advantageously be performed in a paper machine, more preferably in a Fourdrinier paper machine.

A paper machine (or paper-making machine) is an industrial machine which is used in the pulp and paper industry to create paper in large quantities at high speed. Modern paper-making machines are typically based on the principles of the Fourdrinier Machine, which uses a moving woven mesh, a "wire", to create a continuous web by filtering out the fibers held in a pulp suspension and producing a continuously moving wet web of fiber. This wet web is dried in the machine to produce a strong paper web.

The forming, dewatering and joining steps of the inventive method are preferably performed at the forming section of the paper machine, commonly called the wet end. The wet webs are formed on different wires in the forming section of the paper machine. The preferred type of forming section for use with the present invention includes 2 or 3 Fourdrinier wire sections, combined with supporting wire. The wires are preferably endless wires. The wire used in the inventive method preferably has relatively high porosity in order to allow fast dewatering and high drainage capacity. The air permeability of the wire is preferably above 5000 m$^3$/m$^2$/hour at 100 Pa. The wires may preferably comprise at least 500 knuckles per cm$^2$, and more preferably at least 1000 knuckles per cm$^2$ to reduce fiber marking.

The first and second pulp suspensions are aqueous suspensions comprising a water-suspended mixture of cellulose based fibrous material and optionally non-fibrous additives. The inventive method uses pulp suspensions comprising highly refined cellulose fibers. Refining, or beating, of cellulose pulps refers to mechanical treatment and modification of the cellulose fibers in order to provide them with desired properties. The highly refined cellulose fibers can be produced from different raw materials, for example softwood pulp or hardwood pulp. The highly refined cellulose fibers are preferably never dried cellulose fibers.

The term highly refined cellulose fibers as used herein preferably refers to a refined cellulose fibers having a Schopper-Riegler (SR) value of 65 or higher, preferably 70 or higher, as determined by standard ISO 5267-1.

In some embodiments, the first and/or second pulp suspension is formed from a cellulose furnish having a Schopper-Riegler (SR) value in the range of 65-99, preferably in the range of 70-90. In some embodiments, the first and/or second pulp suspension is formed from a cellulose furnish having a Schopper-Riegler (SR) value in the range of 65-75.

The dry solids content of the first and/or second pulp suspension is typically in the range of 0.1-0.7 wt %, preferably in the range of 0.15-0.5 wt %, more preferably in the range of 0.2-0.4 wt %.

The dry solids content of the first and/or second pulp suspension may be comprised solely of the highly refined cellulose fibers, or it can comprise a mixture of highly refined cellulose fibers and other ingredients or additives. The first and/or second pulp suspension preferably includes highly refined cellulose fibers as its main component based on the total dry weight of the pulp suspension. In some embodiments, the first and/or second pulp suspension comprises at least 50 wt %, preferably at least 70 wt %, more preferably at least 80 wt % or at least 90 wt % of highly refined cellulose fibers, based on the total dry weight of the pulp suspension.

In some embodiments, the highly refined cellulose fibers of the first and/or second pulp suspension is refined Kraft pulp. Refined Kraft pulp will typically comprise at least 10% hemicellulose. Thus, in some embodiments the first and/or second pulp suspension comprises hemicellulose at an amount of at least 10%, such as in the range of 10-25%, of the amount of the highly refined cellulose fibers.

The first and/or second pulp suspension may further comprise additives such as native starch or starch derivatives, cellulose derivatives such as sodium carboxymethyl cellulose, a filler, retention and/or drainage chemicals, flocculation additives, deflocculating additives, dry strength additives, softeners, cross-linking aids, sizing chemicals, dyes and colorants, wet strength resins, fixatives, de-foaming aids, microbe and slime control aids, or mixtures thereof. The first and/or second pulp suspension may further comprise additives that will improve different properties of the mixture and/or the produced film such as latex and/or polyvinyl alcohol (PVOH) for enhancing the ductility of the film. The inventive method provides an alternative way of increasing dewatering speed, which is less dependent on the addition of retention and drainage chemicals, but smaller amounts of retention and drainage chemicals may still be used.

The inventive method is especially useful for manufacturing films of so called microfibrillated cellulose (MFC). Thus, in some embodiments the highly refined cellulose fibers is MFC.

Microfibrillated cellulose (MFC) shall in the context of the patent application be understood to mean a nano scale cellulose particle fiber or fibril with at least one dimension less than 100 nm. MFC comprises partly or totally fibrillated cellulose or lignocellulose fibers. The liberated fibrils have a diameter less than 100 nm, whereas the actual fibril diameter or particle size distribution and/or aspect ratio (length/width) depends on the source and the manufacturing methods. The smallest fibril is called elementary fibril and has a diameter of approximately 2-4 nm (see e.g. Chinga-Carrasco, G., *Cellulose fibres, nanofibrils and microfibrils: The morphological sequence of MFC components from a plant physiology and fibre technology point of view,* *Nanoscale research letters* 2011, 6:417), while it is common that the aggregated form of the elementary fibrils, also defined as microfibril (Fengel, D., *Ultrastructural behavior of cell wall polysaccharides,* Tappi J., March 1970, Vol 53, No. 3), is the main product that is obtained when making MFC e.g. by using an extended refining process or pressure-drop disintegration process. Depending on the source and the manufacturing process, the length of the fibrils can vary from around 1 to more than 10 micrometers. A coarse MFC grade might contain a substantial fraction of fibrillated fibers, i.e. protruding fibrils from the tracheid (cellulose fiber), and with a certain amount of fibrils liberated from the tracheid (cellulose fiber).

There are different acronyms for MFC such as cellulose microfibrils, fibrillated cellulose, nanofibrillated cellulose, fibril aggregates, nanoscale cellulose fibrils, cellulose nanofibers, cellulose nanofibrils, cellulose microfibers, cellulose fibrils, microfibrillar cellulose, microfibril aggregates and cellulose microfibril aggregates. MFC can also be characterized by various physical or physical-chemical properties such as its large surface area or its ability to form a gel-like material at low solids (1-5 wt %) when dispersed in water.

Various methods exist to make MFC, such as single or multiple pass refining, pre-hydrolysis followed by refining or high shear disintegration or liberation of fibrils. One or several pre-treatment steps are usually required in order to make MFC manufacturing both energy efficient and sustainable. The cellulose fibers of the pulp to be utilized may thus be pre-treated, for example enzymatically or chemically, to hydrolyse or swell the fibers or to reduce the quantity of hemicellulose or lignin. The cellulose fibers may be chemically modified before fibrillation, such that the cellulose molecules contain other (or more) functional groups than found in the native cellulose. Such groups include, among others, carboxymethyl (CMC), aldehyde and/or carboxyl groups (cellulose obtained by N-oxyl mediated oxidation, for example "TEMPO"), quaternary ammonium (cationic cellulose) or phosphoryl groups. After being modified or oxidized in one of the above-described methods, it is easier to disintegrate the fibers into MFC or nanofibrils.

The nanofibrillar cellulose may contain some hemicelluloses, the amount of which is dependent on the plant source. Mechanical disintegration of the pre-treated fibers, e.g. hydrolysed, pre-swelled, or oxidized cellulose raw material is carried out with suitable equipment such as a refiner, grinder, homogenizer, colloider, friction grinder, ultrasound sonicator, fluidizer such as microfluidizer, macrofluidizer or fluidizer-type homogenizer. Depending on the MFC manufacturing method, the product might also contain fines, or nanocrystalline cellulose, or other chemicals present in wood fibers or in papermaking process. The product might also contain various amounts of micron size fiber particles that have not been efficiently fibrillated.

MFC is produced from wood cellulose fibers, both from hardwood and softwood fibers. It can also be made from microbial sources, agricultural fibers such as wheat straw pulp, bamboo, bagasse, or other non-wood fiber sources. It is preferably made from pulp including pulp from virgin fiber, e.g. mechanical, chemical and/or thermomechanical pulps. It can also be made from broke or recycled paper.

The dry solids content of the first and/or second pulp suspension may be comprised solely of MFC, or it can comprise a mixture of MFC and other ingredients or additives. The first and/or second pulp suspension preferably includes MFC as its main component based on the total dry weight of the pulp suspension. In some embodiments, the first and/or second pulp suspension comprises 50-99 wt %, preferably at least 70-99 wt %, more preferably at least 80-99 wt % MFC, based on the total dry weight of the pulp suspension.

In some embodiments, at least some of the MFC is obtained from MFC broke.

In addition to the highly refined cellulose fibers, the first and/or second pulp suspension may also comprise a certain amount of unrefined or slightly refined cellulose fibers. The term unrefined or slightly refined fibers as used herein preferably refers to cellulose fibers having a Schopper-Riegler (SR) value below 30, preferably below 28, as determined by standard ISO 5267-1. Unrefined or slightly refined cellulose fibers are useful to enhance dewatering and may also improve strength and fracture toughness of the multilayer film. In some embodiments, the first and/or second pulp suspension comprises 0.1-50 wt %, preferably 0.1-30 wt %, and more preferably 0.1-10 wt % of unrefined or slightly refined cellulose fibers, based on the total dry weight of the pulp suspension. The unrefined or slightly refined cellulose fibers may for example be obtained from bleached or unbleached or mechanical or chemimechanical pulp or other high yield pulps. The unrefined or slightly refined cellulose fibers are preferably never dried cellulose fibers.

The pH value of the first and/or second pulp suspension may typically be in the range of 4-10 preferably in the range of 5-8, and more preferably in the range of 5.5-7.5.

The temperature of the first and/or second pulp suspension may typically be in the range of 30-70° C., preferably in the range of 40-60° C., and more preferably in the range of 45-55° C.

The composition of the first and second pulp suspension may be the same or different. For example, in some embodiments one of the pulp suspensions may comprise unrefined or slightly refined cellulose fibers while the other pulp suspension does not comprise unrefined or slightly refined cellulose fibers. One possibility is to have a first pulp suspension with less highly refined cellulose fibers with lower SR value and/or a higher amount of unrefined or slightly refined cellulose fibers to provide faster dewatering, and a second pulp suspension with more highly refined cellulose fibers with higher SR value and/or a lower amount of unrefined or slightly refined cellulose fibers to provide good barrier properties or to provide one surface having very high smoothness. The first web formed from the first pulp suspension may have a slightly higher grammage, e.g. in the range of 25-30 g/m², than the second web formed from the second pulp suspension, e.g. having a grammage in the range of 15-20 g/m².

In some embodiments, the first and second pulp suspension are provided from two different headboxes. This may be advantageous since the headboxes can be operated in slightly different manners, e.g. with different consistencies, head box jet angles, or jet-to-wire ratios.

In some embodiments, the first and second pulp suspension have the same composition. This can simplify the process as only one pulp suspension source is required. Also, having the same composition may lead to less problems with curl in the finished film the two layers of the multilayer film will have the same composition.

The basis weight of each of the first and/or second wet web based on the total dry weight of the web is preferably less than 50 g/m² and more preferably less than 30 g/m². A grammage of less than 50 g/m² or 30 g/m² has been found to allow for a quick partial dewatering of the wet web with little pinhole formation. The basis weight of the first and/or second wet web based on the total dry weight of the web is preferably at least 5 g/m². Thus, in some embodiments, the basis weight of the first and/or second wet web based on the total dry weight of the web is in the range of 5-50 g/m², more preferably in the range of 5-30 g/m².

After being formed, the first and second wet web are partially dewatered. Dewatering of the webs on the wire may be performed using methods and equipment known in the art, examples include but are not limited to table roll and foils, friction less dewatering and ultra-sound assisted dewatering. Partial dewatering means that the dry solids content of the wet web is reduced compared to the dry solids content of the pulp suspension, but that the dewatered web still comprises a significant amount of water. In some embodiments, partial dewatering of the wet webs means that the dry solids content of the first and second partially dewatered web is above 1 wt % but below 15 wt %. In some embodiments, partial dewatering of the wet webs means that the dry solids content of the first and second partially dewatered web is above 1 wt % but below 10 wt %. A dry solids content of the first and second partially dewatered web in this range has been found to be especially suitable for joining the first and second wet web into a multilayer web. In some embodiments, the dry solids content of the first and second partially dewatered web prior to the joining step is in the range of 1.5-8 wt %, preferably in the range of 2.5-6 wt %, and more preferably in the range of 3-4.5 wt %.

A binder is applied to one or both of the partially dewatered but still wet webs. The binder may be any substance or material which acts to increase the adhesion between the layers of the formed multilayer film. The binder may be in liquid or solid form and may for example be applied to the partially dewatered web by spraying or curtain coating.

In some embodiments, the binder is a polymeric binder. Binders are typically natural or synthetic polymers. The polymers are preferably water soluble or water dispersible (e.g. latices), allowing them to be applied in liquid form as aqueous solutions or aqueous dispersions. Examples of binders that may be useful in the present invention include, but are not limited to cellulose derivatives, native and modified starches, polyvinyl alcohol or partially hydrolysed polyvinyl alcohol and derivatives thereof, and hemicelluloses. A solution or dispersion comprising the binder may also contain other functional additives such as one or more crosslinkers, softeners and/or humectants.

The binder is preferably based on renewable raw materials. The binder is preferably selected such that is does not negatively affect the repulpability and recyclability of the multilayer film. In some embodiments, the binder comprises polymers obtained from wood or other plant based raw materials.

In some embodiments, the binder is selected from the group consisting of nanocellulose and lignin, and derivatives thereof. These binders are useful since they are based on renewable raw materials and do not negatively affect the repulpability and recyclability of the multilayer film. Nanocellulose is advantageous as it is similar to the highly refined cellulose fibers of the multilayer film, and uses high surface area to improve contact and adhesion. Lignin is advantageous as it, in addition to providing improved adhesion, also acts as a UV light barrier in the multilayer film.

The binder can be a single binder or a mixture of two or more binders, for example a mixture of nanocellulose and water soluble polymer in the ratio of 100:1 to 1:100.

In some embodiments, the binder further comprises nanopigment particles, preferably in an amount 0-50 wt % of the binder amount.

In some embodiments, the binder further comprises a crosslinking agent. A preferred crosslinking agent is citric acid.

The binder is preferably applied at a basis weight which is lower than the basis weight of the multilayer film, and preferably lower than the basis weight of each of the web layers, based on dry weight. In some embodiments, the binder is applied at a basis weight of less than 20 $g/m^2$, preferably less than 15 $g/m^2$, more preferably less than 10 $g/m^2$ or less than 5 $g/m^2$ based on the total dry weight of the binder. In some embodiments, the binder is applied at a basis weight in the range of 0.1-20 $g/m^2$, preferably in the range of 0.3-15 $g/m^2$, more preferably in the range of 0.5-5 $g/m^2$, based on the total dry weight of the binder.

The binder may for example be applied in the form of a liquid solution or suspension, preferably an aqueous solution or suspension.

In some embodiments, the binder is applied in the form of a suspension. The solid content of the suspension may be in the range of 0.5-50 wt %, and preferably in the range of 1-30 wt %.

The liquid solution or suspension may for example be applied using a non-contact deposition technique, such as preferably spray coating or curtain coating (e.g. slot or die). In some embodiments, the binder is applied in the form of a foam formed of a liquid solution or suspension comprising the binder and a foaming agent. The foaming agent may be any suitable foaming agent. PVOH is a preferred foaming agent. The foam may be applied to one or both of the partially dewatered but still wet webs using a foam applicator.

In a more specific embodiment, the binder is applied in the form of an aqueous suspension. The suspension is preferably applied at a temperature of in the range of 30-95° C. and more preferably at a temperature in the range of 40-80° C. The pH of suspension may vary depending on e.g. raw material composition and use of additives.

The partially dewatered but still wet webs are joined to form a higher grammage multilayer web. The dry solids content of the first and second partially dewatered web when they are joined is preferably above 1 wt % but below 15 wt % and more preferably above 1 wt % but below 10 wt %. In some embodiments, the application of the binder may increase the solids content of a web to which it is applied, and the web with the applied binder may have a solids content above 1 wt % but below 20 wt %. In some embodiments, the dry solids content of the first and second partially dewatered web when they are joined is in the range of 1.5-8 wt %, preferably in the range of 2.5-6 wt %, and more preferably in the range of 3-4.5 wt %. The partially dewatered webs are preferably joined by wet lamination. When the pulp suspension is dewatered on the wire a visible boundary line will appear at a point where the web goes from having a reflective water layer to where this reflective layer disappears. This boundary line between the reflective and non-reflective web is referred to as the waterline. The waterline is indicative of a certain solids content of the web. The webs are preferably joined after the water line. Joining the webs while they are still wet ensures good adhesion between the layers. The binder present on one or both of the web surfaces to be joined further improves contact and adhesion between the layers. The joining can be achieved by applying one of the partially dewatered webs on top of the other. The joining may be done non-wire side against non-wire side, or wire-side against non-wire side. Joining and further dewatering of the formed multilayer web may be improved by various additional operations. In some embodiments, the joining further comprises pressing the first and second partially dewatered web together.

In some embodiments, the joining further comprises applying suction to the joined first and second partially dewatered web. Applying pressure and/or suction to the formed multilayer web improves adhesion between the web layers. The wire section of a paper machine may have various dewatering devices such as blade, table and/or foil elements, suction boxes, friction less dewatering, ultrasound assisted dewatering, couch rolls, or a dandy roll.

The surface of the web facing the wire is referred to as the wire side and the surface of the web facing away from the wire is referred to as the non-wire side.

When dewatering highly refined cellulose fibers, particularly MFC, on a wire it has been found that there will be a difference in fines contents between the non-wire side and the wire side. Fines are typically concentrated at the non-wire side and more fines are washed away from the wire side where the dewatering occurs. This difference or imbalance in the web composition cause problems with curling of the finished film due to changes in humidity. Forming a multilayer film according to the invention can solve or ameliorate this problem by reducing the imbalance in the web composition.

The joining of the webs may preferably be done non-wire side against non-wire side, or non-wire side against wire side. Joining the webs non-wire side against non-wire side, or wire side against non-wire side gives an additional advantage in that a larger portion of fines is concentrated towards the middle of the multilayer film. This concentration of fines contributes both to adhesion between the layers and to the gas barrier properties of the film. The fines may also contribute to a self-healing phenomenon, where fines redistribute to fill voids in the felted sheet on the wet wire, thus making produced film less porous.

Joining the webs non-wire side against non-wire side is preferred, since i) fines will be concentrated in the middle, ii) the film structure will be symmetrical, reducing curling problems, iii) high concentration of fines at contact surfaces will ensure good bonding between layers, and iv) more porous outer surfaces (wire sides) allow for more efficient dewatering in the press section and faster drying.

Applying a binder between the partially dewatered webs will further improve contact and adhesion between the webs when they are joined. This may be of particular interest when it is preferred to join the webs wire side against wire side as these surfaces may contain less fines and therefore may provide less adhesion as compared to the non-wire sides. Joining the webs wire side against wire side may for example be of interest in order to obtain a multilayer film with low surface roughness.

The dry solids content of the multilayer web is typically further increased during the joining step. The increase in dry solids content may be due to dewatering of the multilayer web on the wire with optional pressure and/or suction applied to the web, and also due to drying operations performed during or shortly after the joining, e.g. impingement drying or air or steam drying. The dry solids content of the multilayer web after joining, with optional application of pressure and/or suction, is typically above 8 wt % but below 28 wt %. In some embodiments, the dry solids content of the multilayer web prior to the further dewatering and optional drying step is in the range of 8-28 wt %, preferably in the range of 10-20 wt %, and more preferably in the range of 12-18 wt %.

The basis weight of the multilayer web, and the multilayer film, based on the total dry weight of the web is typically less than 100 g/m², preferably less than 60 g/m², and more preferably less than 40 g/m². In some embodiments, the basis weight of the multilayer web, and the multilayer film, based on the total dry weight of the web is in the range of 10-100 g/m², preferably in the range of 10-60 g/m², more preferably in the range of 10-40 g/m². Pinhole free films with basis weights in these ranges have been found have good oxygen barrier properties.

The invention is described herein mainly with reference to an embodiment wherein the multilayer film is formed from two web layers comprising highly refined cellulose fibers. However, it is understood that the multilayer film may also comprise additional web layers comprising highly refined cellulose fibers. Thus, it is also possible that the formed multilayer film is formed from three or more web layers comprising highly refined cellulose fibers, such as three, four, five, six, or seven layers. The forming, composition and structure of each additional layer may be further characterized as described above with reference to the first and second web layer. Thus, in some embodiments the method for manufacturing a multilayer film further comprises the steps:
- c2) forming a third wet web by applying a third pulp suspension comprising highly refined cellulose fibers on a third wire;
- d2) partially dewatering the third wet web to obtain a third partially dewatered web;
- e2) joining the first, second and third partially dewatered web to obtain a multilayer web.

In the further dewatering and optional drying step f), the dry solids content of the multilayer web is typically further increased. The resulting multilayer film preferably has a dry solids content above 90 wt %.

The further dewatering typically comprises pressing the web to squeeze out as much water as possible. The further dewatering may for example include passing the formed multilayer web through a press section of a paper machine, where the web passes between large rolls loaded under high pressure to squeeze out as much water as possible. The removed water is typically received by a fabric or felt. In some embodiments, the dry solids content of the multilayer film after the further dewatering is in the range of 15-48 wt %, preferably in the range of 18-40 wt %, and more preferably in the range of 22-35 wt %.

The optional drying may for example include drying the multilayer web by passing the multilayer web around a series of heated drying cylinders. Drying may typically remove the water content down to a level of about 1-15 wt %, preferably to about 2-10 wt %.

The dry solids content of the final multilayer film may vary depending on the intended use of the film. For example a film for use as a stand-alone product may have a dry solids content in the range of 85-99 wt %, preferably in the range of 90-98 wt %, whereas a film for use in further lamination to form paper or paperboard based packaging material may have a dry solids content in the range of less than 90 wt %, preferably less than 85 wt %, such as in the range of 30-85 wt %.

Pinholes are microscopic holes that can appear in the web during the forming process. Examples of reasons for the appearance of pinholes include irregularities in the pulp suspension, e.g. formed by flocculation or re-flocculation of fibrils, rough dewatering fabric, uneven pulp distribution on the wire, or too low a web grammage. In some embodiments, the multilayer film comprises less than 10 pinholes/m², preferably less than 8 pinholes/m², and more preferably less than 2 pinholes/m², as measured according to standard EN13676:2001. The measurement involves treating the multilayer film with a coloring solution (e.g. dyestuff E131 Blue in ethanol) and inspecting the surface microscopically.

The multilayer film will typically exhibit good resistance to grease and oil. Grease resistance of the multilayer film was evaluated by the KIT-test according to standard ISO 16532-2. The test uses a series of mixtures of castor oil, toluene and heptane. As the ratio of oil to solvent is decreased, the viscosity and surface tension also decrease, making successive mixtures more difficult to withstand. The performance is rated by the highest numbered solution which does not darken the sheet after 15 seconds. The highest numbered solution (the most aggressive) that remains on the surface of the paper without causing failure is reported as the "kit rating" (maximum 12). In some embodiments, the KIT value of the multilayer film is at least 6, preferably at least 8, as measured according to standard ISO 16532-2.

In some embodiments, the multilayer film has a Gurley Hill value of at least 10 000 s/100 ml, preferably at least 25000 s/100 ml, and more preferably at least 40 000 s/100 ml, as measured according to standard ISO 5636/6.

The multilayer film preferably has high repulpability. In some embodiments, the multilayer film exhibits less than 30%, preferably less than 20%, and more preferably less than 10% residues, when tested as a category II material according to the PTS-RH 021/97 test method.

Films comprising high amounts of highly refined cellulose fibers are typically transparent or translucent to visible light. Thus, in some embodiments the multilayer film is transparent or translucent to visible light.

In a more specific embodiment, the inventive method comprises:
i) Preparing a first furnish from a fiber mix comprising a 5-15 wt % of unrefined or slightly refined bleached softwood or hardwood kraft pulp having a Schopper-Riegler (SR) value in the range of 15-25, preferably in the range of 20-25 and 95-85% of highly refined bleached softwood or hardwood kraft pulp in the form of MFC having a SR value of at least 90. All of the cellulosic material can be prepared from same kraft pulp source, where the highly refined fiber is obtained by intensive refining and/or homogenization and optional enzymatic pre-treatment of the fibers. The pH of the first furnish is between 6.5 and 8.5.

Water retention value (WRV) of the mixture is about 300-350%. The SR value for the mix (without any further chemicals added) is at least 70, and preferably at least 75. Accordingly, the mixture will exhibit high drainage resistance.

The first furnish is prepared to a consistency of 0.15-0.35 wt % and a temperature of 35-45° C. To the furnish, process chemicals like retention aids (one or two or multicomponent), formation aids (non-ionic or anionic water soluble polymers such as CMC), and optionally other additives such as fillers (<10 wt %), wet strength additives, hydrophobizing chemicals (<5 kg/tn) are added.

ii) Preparing a second furnish according to the same recipe as for the first furnish, but with 5-20% less MFC.

iii) Forming and partially dewatering a first web layer using a foudrinier technique on a first wire. The grammage of the first layer is 20 g/m².

iv) Forming and partially dewatering a second web layer using a foudrinier technique on a second wire. The grammage of the second layer is 20 g/m².

v) Spraying a binder in the form of an aqueous nanocellulose suspension onto the surface of the partially dewatered first web layer to be contacted with the partially dewatered second web layer. The grammage of the binder is 5 g/m$^2$, based on the total dry weight of the binder.

vi) Transferring and joining the second web layer to the first web layer such that the binder is sandwiched between the two layers, and pressing the two layers together to ensure contact and adhesion between the layers, and to further dewater the formed multilayer web. The dry solids content of the first and second web layer prior to the joining step is in the range of 1.5-8 wt %. The solid content of the second layer is slightly lower than the solid content of the first layer.

vii) further dewatering, and optionally drying, the multilayer web to obtain the multilayer film.

The obtained product is free from pinholes and has good oxygen barrier properties (less than 15 cc/m$^2$/24 h/atm as measured according to the standard ASTM D-3985 at 50% relative humidity and 23° C.) and grease barrier properties (KIT>11). The PPS10 surface roughness for the uncalendered base is above 3.0 and density is in the range of 600-900 kg/m$^3$.

According to a second aspect illustrated herein, there is provided a multilayer film comprising highly refined cellulose fibers, said film comprising:

a first layer comprising highly refined cellulose fibers, and a second layer comprising highly refined cellulose fibers, wherein said first and second layers are joined by a binder applied between said first and second layer.

In some embodiments, the binder is a polymeric binder.

In some embodiments, the binder is selected from the group consisting of nanocellulose and lignin, and derivatives thereof.

In some embodiments, the basis weight of the binder is less than 20 g/m$^2$, preferably less than 15 g/m$^2$, more preferably less than 10 g/m$^2$.

In some embodiments, the multilayer film is obtainable by the inventive method.

The inventive multilayer films are especially suited as thin packaging films when coated or laminated with one or more layers of a thermoplastic polymer. Thus, the multilayer film may preferably be coated or laminated with one or more polymer layers.

The multilayer film may be provided with a polymer layer on one side or on both sides.

The polymer layer may comprise any of the thermoplastic polymers commonly used in paper or paperboard based packaging materials in general or polymers used in liquid packaging board in particular. Examples include polyethylene (PE), polyethylene terephthalate (PET), polypropylene (PP), polylactic acid (PLA), polyglycolic acid (PGA), starch and cellulose. Polyethylenes, especially low density polyethylene (LDPE) and high density polyethylene (HDPE), are the most common and versatile polymers used in liquid packaging board.

Thermoplastic polymers, are useful since they can be conveniently processed by extrusion coating techniques to form very thin and homogenous films with good liquid barrier properties. In some embodiments, the polymer layer comprises polypropylene or polyethylene. In preferred embodiments, the polymer layer comprises polyethylene, more preferably LDPE or HDPE.

The polymer layer may comprise one or more layers formed of the same polymeric resin or of different polymeric resins. In some embodiments the polymer layer comprises a mixture of two or more different polymeric resins. In some embodiments the polymer layer is a multilayer structure comprised of two or more layers, wherein a first layer is comprised of a first polymeric resin and a second layer is comprised of a second polymeric resin, which is different from the first polymeric resin.

In some embodiments, the polymer layer is formed by extrusion coating of the polymer onto a surface of the multilayer film. Extrusion coating is a process by which a molten plastic material is applied to a substrate to form a very thin, smooth and uniform layer. The coating can be formed by the extruded plastic itself, or the molten plastic can be used as an adhesive to laminate a solid plastic film onto the substrate. Common plastic resins used in extrusion coating include polyethylene (PE), polypropylene (PP), and polyethylene terephthalate (PET).

The basis weight of each polymer layer of the multilayer film is preferably less than 50 g/m$^2$. In order to achieve a continuous and substantially defect free film, a basis weight of the polymer layer of at least 8 g/m$^2$, preferably at least 12 g/m$^2$ is typically required. In some embodiments, the basis weight of the polymer layer is in the range of 8-50 g/m$^2$, preferably in the range of 12-50 g/m$^2$.

The inventive multilayer film may preferably be used as a gas barrier layer in a paper or paperboard based packaging material, e.g. in liquid packaging board (LPB) for use in the packaging of liquids or liquid containing products. Therefore, according to a third aspect illustrated herein, there is provided a paper or paperboard based packaging material comprising:

a paper or paperboard substrate; and a multilayer film obtainable by the inventive method.

Paper generally refers to a material manufactured in sheets or rolls from the pulp of wood or other fibrous substances comprising cellulose fibers, used for e.g. writing, drawing, or printing on, or as packaging material. Paper can either be bleached or unbleached, coated or uncoated, and produced in a variety of thicknesses, depending on the end-use requirements.

Paperboard generally refers to strong, thick paper or cardboard comprising cellulose fibers used for example as flat substrates, trays, boxes and/or other types of packaging. Paperboard can either be bleached or unbleached, coated or uncoated, and produced in a variety of thicknesses, depending on the end-use requirements.

The multilayer film of the paper or paperboard based packaging material according to the second aspect may be further defined as set out above with reference to the first aspect.

In some embodiments, the multilayer film is attached to the paper or paperboard substrate directly, e.g. when the multilayer film is wet laid onto the substrate. Thus, in some embodiments the multilayer film is in direct contact with the substrate.

In other embodiments, the multilayer film is attached to the paper or paperboard substrate indirectly, e.g. when the multilayer film is laminated onto the substrate using an adhesive layer disposed between the substrate and the multilayer film. Thus, in some embodiments the paper or paperboard based packaging material further comprises an adhesive layer disposed between the substrate and the multilayer film.

In some embodiments, the paper or paperboard based packaging material has a water vapor transfer rate (WVTR), measured according to the standard ISO 15106-2/ASTM F1249 at 50% relative humidity and 23° C., of less than 200 g/m$^2$/24 h.

In some embodiments, the paper or paperboard based packaging material has an oxygen transfer rate (OTR), measured according to the standard ASTM D-3985 at 50% relative humidity and 23° C., of less than 1000 cc/m$^2$/24 h/atm, preferably less than 500 cc/m²/24 h/atm, more preferably less than 100 cc/m²/24 h/atm, and most preferably less than 50 cc/m²/24 h/atm.

Generally, while the products, polymers, materials, layers and processes are described in terms of "comprising" various components or steps, the products, polymers, materials, layers and processes can also "consist essentially of" or "consist of" the various components and steps.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

EXAMPLE

An experiment was performed in a pilot fourdrinier machine to show that the dewatering speed, and as a result also the running speed, can be increased using two fourdrinier wire sections.
Running Conditions
  Pulp mixture: 100% MFC
  Water retention value: >350%
  SR: >90
  Additives: cationic starch, cationic retention aid, anionic retention aid, hydrophobic sizing, wet strength agent
  pH: 7.5
  Temperature: 45° C.
  Wet pressing: 3 nip 10/15/15 kN/m
Reference Trial Point
  As a reference, a 30 g/m² web was run on wire section 1 at a running speed of 30 m/min. The wire retention was 99%. The water line was so late that running speed increase was not possible with this set up.
Trial Point 1
  A first web was run on wire section 1 and second web was run on wire section 2. Each web was run at 20 g/m² at a running speed of 30 m/min. The wire retention on each wire was 99.6%. The webs were joined in the wet state to form a multilayer web with a combined weight of 40 g/m² and the multilayer web was further dewatered. Based on the water line position it was clear that much higher running speed would have been possible
Trial Point 2
  A first web was run on wire section 1 and second web was run on wire section 2. Each web was run at 15 g/m² at a running speed of 45 m/min. The wire retention on each wire was 98.8%. The webs were joined in the wet state to form a multilayer web with a combined weight of 30 g/m² and the multilayer web was further dewatered. Based on the water line position it was clear that even higher running speed would have been possible The results show that the dewatering speed, and as a result also the running speed, can be increased using two fourdrinier wire sections. All three films obtained had high Gurley Hill values (42 300 s/ml as measured according to standard ISO 5636/6, which was the instrument maximum) which indicates that the higher running speed did not significantly affect the barrier properties of the film.

The invention claimed is:

1. A method for manufacturing a multilayer film comprising highly refined cellulose fibers, the method comprising the steps of:
   a) forming a first wet web by applying a first pulp suspension comprising highly refined cellulose fibers having a Schopper-Riegler (SR) value of 65 or higher, as determined by standard ISO 5267-1, on a first wire;
   b) partially dewatering the first wet web to obtain a first partially dewatered web;
   c) forming a second wet web by applying a second pulp suspension comprising highly refined cellulose fibers having a Schopper-Riegler (SR) value of 65 or higher, as determined by standard ISO 5267-1, on a second wire;
   d) partially dewatering the second wet web to obtain a second partially dewatered web;
   e) applying a binder between the first partially dewatered web and the second partially dewatered web by spray coating, curtain coating, or foam coating and joining the first partially dewatered web and the second partially dewatered web to obtain a multilayer web; and
   f) further dewatering the multilayer web to obtain a multilayer film comprising highly refined cellulose fibers,
   wherein a dry solids content of the first pulp suspension, the second pulp suspension, or both is in a range of 0.1-0.7 wt %.

2. The method according to claim 1, wherein the first pulp suspension, the second pulp suspension, or both comprises at least 50 wt % highly refined cellulose fibers, based on a total dry weight of the pulp suspension.

3. The method according to claim 1, wherein the first pulp suspension, the second pulp suspension, or both is formed from a cellulose furnish having a Schopper-Riegler (SR) value in a range of 65-99, as determined by standard ISO 5267-1.

4. The method according to claim 1, wherein the highly refined cellulose fibers comprise microfibrillated cellulose (MFC).

5. The method according to claim 4, wherein the first pulp suspension, the second pulp suspension, or both comprises 50-99 wt % MFC, based on a total dry weight of said pulp suspension.

6. The method according to claim 1, wherein the first pulp suspension, the second pulp suspension, or both comprise less than 50 wt % of unrefined or slightly refined cellulose fibers having a Schopper-Riegler (SR) value below 30 as determined by standard ISO 5267-1, based on a total dry weight of the pulp suspension.

7. The method according to claim 1, wherein the first pulp suspension and the second pulp suspension have the same composition.

8. The method according to claim 1, wherein a basis weight of the first wet web, the second wet web, or both based on a total dry weight of said wet web is less than 50 g/m².

9. The method according to claim 1, wherein the binder is a polymeric binder.

10. The method according to claim 1, wherein the binder is selected from a group consisting of: nanocellulose, lignin, and derivatives thereof.

11. The method according to claim 1, wherein the binder is applied at a basis weight in a range of 0.1-20 g/m².

12. The method according to claim 1, wherein a dry solids content of the first partially dewatered web and the second partially dewatered web prior to the joining step is in a range of 1.5-8 wt %.

13. The method according to claim 1, wherein a basis weight of the multilayer web based on a total dry weight of the multilayer web is in a range of 10-100 g/m$^2$.

14. The method according to claim 1, wherein the multilayer film is transparent or translucent to visible light.

15. The method according to claim 1, wherein a KIT value of the multilayer film is at least 6, as measured according to standard ISO 16532-2.

16. The method according to claim 1, wherein the multilayer film comprises less than 10 pinholes/m$^2$, as measured according to standard EN13676:2001.

17. The method according to claim 1, wherein the multilayer film has a Gurley Hill value of at least 10 000 s/100 ml, as measured according to standard ISO 5636/6.

18. A multilayer film with highly refined cellulose fibers, said film comprising:

a first layer comprising highly refined cellulose fibers having a Schopper-Riegler (SR) value of 65 or higher, as determined by standard ISO 5267-1, and a second layer comprising highly refined cellulose fibers having a Schopper-Riegler (SR) value of 65 or higher, as determined by standard ISO 5267-1, wherein said first and second layers are joined by a binder applied by spray coating, curtain coating, or foam coating between said first and second layer, wherein the first layer, the second layer or both are formed from a suspension with a dry solids content in a range of 0.1-0.7 wt % such that multilayer film comprises less than 10 pinholes/m$^2$, as measured according to standard EN13676:2001.

19. The multilayer film according to claim 18, wherein the binder is a polymeric binder.

20. The multilayer film according to claim 18, wherein the binder is selected from a group consisting of: nanocellulose, lignin, and derivatives thereof.

21. The multilayer film according to claim 18, wherein the binder is applied at a basis weight of less than 20 g/m$^2$.

* * * * *